United States Patent Office 3,493,337
Patented Feb. 3, 1970

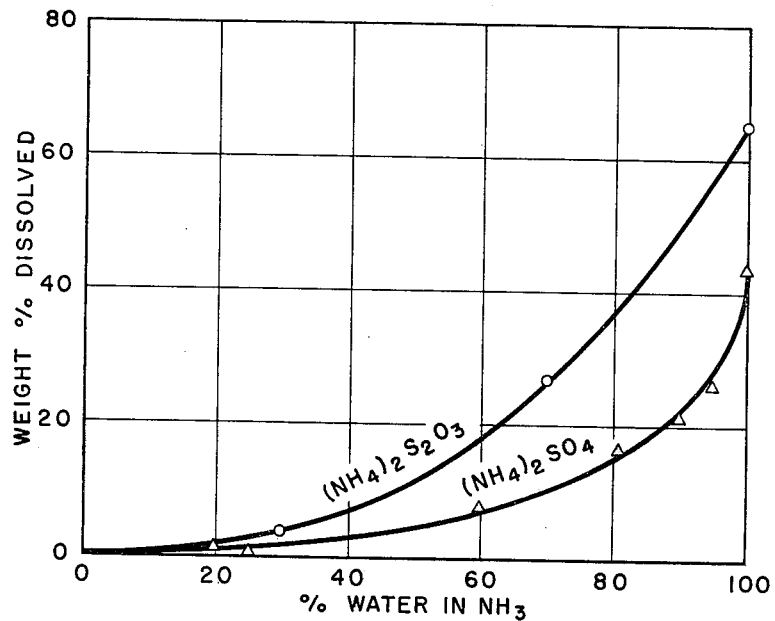

3,493,337
MANUFACTURE OF AMMONIUM THIOSULFATE AND AMMONIUM SULFATE
Richard L. Every, Ponca City, Okla., and Paul F. Cox, Richardson, Tex., assignors to Continental Oil Company, Ponca City, Okla., a corporation of Delaware
Continuation-in-part of application Ser. No. 474,425, July 23, 1965. This application July 1, 1968, Ser. No. 748,123
Int. Cl. C01b 17/64
U.S. Cl. 23—115                          4 Claims

ABSTRACT OF THE DISCLOSURE

This invention relates to manufacture of ammonium thiosulfate and ammonium sulfate from ammonia, sulfur, and oxygen. In one aspect, the present invention contemplates a process wherein elemental sulfur is dissolved in liquid ammonia and thereafter oxygen gas is bubbled into the solution. In a preferred embodiment, a limited amount of water is present in the reaction and the temperature is maintained at below about 90° C. In addition, it has been found most advantageous to utilize an excess of ammonia in the reaction.

---

This is a continuation-in-part of our application Ser. No. 474,425, filed July 23, 1965, and now abandoned.

In the earlier filed application certain data in the table were inadvertently omitted, and this refiled application is being filed to better inform the art as to the effects of different variables.

This invention relates to the manufacture of ammonium thiosulfate and ammonium sulfate.

Both ammonium sulfate and ammonium thiosulfate are well known commercial chemicals. Ammonium sulfate is widely used as fertilizer among its other uses, whereas ammonium thiosulfate has found application in photographic fixing solutions. The ammonium thiosulfate use has been limited due to its high cost. However, it is recognized to be faster in photographic fixing solution and superior in many ways to the less expensive sodium sulfate now widely used. Also, with the increased emphasis on desirability of sulfur in certain fertilizer uses, the ammonium thiosulfate would be an attractive source of a plant food were it not for its high cost.

Previous processes for the manufacture of ammonium thiosulfate have been limited to batch operations. These processes outline various schemes for making ammonium thiosulfate in aqueous solutions, and, since ammonium thiosulfate is quite soluble in water, we have the batch limitation. The recovery of ammonium thiosulfate from these solutions presents some problems. Vacuum distillation has been used, but is expensive. Addition of $NH_3$ to the solution to cause precipitation has been used. In this case, however, after the precipitate has been removed, the ammonia solution must either be diluted with water (hence a net make of diluted solution), or the ammonia recovered by fractional distillation plus compression and condensation, another expensive operation. Where the ammonium thiosulfate is to be used as a photographic fixing solution, the ammonium thiosulfate solution can be compounded with additional ingredients and not separated. This, however, adds to packaging and shipping costs.

Ammonium sulfate is generally made industrially by reacting ammonia and concentrated sulfuric acid. Since the sulfuric acid is generally prepared by burning sulfur, and the ammonia-sulfuric acid reaction must be carefully controlled—even this method is more expensive than that of our invention.

It is an object of this invention to provide an improved process for manufacture of ammonium thiosulfate and ammonium sulfate.

According to this invention, sulfur is dissolved in liquid ammonia and oxygen or oxygen-containing gas, such as air, is bubbled through the solution.

In one aspect, certain additives such as $H_2O$ or $H_2S$ can be included in the solution.

While the method of the invention can be carried out batchwise, one of the advantages of the invention is that it can readily be carried out continuously.

Sulfur is dissolved in liquid ammonia, and the oxygen gas is bubbled into the solution. The reaction produces a mixture of ammonium thiosulfate and ammonium sulfate, both of which are insoluble in ammonia. The precipitate can be continuously removed from the reaction zone and ammonia sulfur solution continuously added in an amount that the sulfur and ammonia are continuously replaced as the product is formed.

When $H_2O$ or $H_2S$ is present, apparently the extra hydrogen in the ammonium portion of the compound probably comes from these materials. However, in the absence of such materials, the extra hydrogen must come from the ammonia forming a nitrogen complex which is soluble in the ammonia. The mechanism is not known to us at this time.

The reaction can be carried out over a wide range of temperatures and pressures. In general, it can be stated that the reaction can be carried out under any temperature and pressure condition wherein the ammonia is in the liquid state. For example, we have used temperatures from minus 33° C. to as high as 90° C. and from atmospheric pressures up to 2800 pounds per square inch gauge. For optimum production of the thiosulfate, we prefer low temperatures. We have also found that a small amount of $H_2S$ or $H_2O$ will increase the ratio of ammonium thiosulfate to ammonium sulfate in the product.

Where the product is to be used in a fixing solution, it is especially desirable to have a high ratio of ammonium thiosulfate to ammonium sulfate. In the case of plant food, this is not so important.

When the product is added to irrigation water, the ammonium thiosulfate has the additional advantage over ammonium sulfate in that it improves the physical properties of "tight" soils, thus permitting greater penetration of water.

In carrying out the process, an excess of liquid ammonia is utilized as the liquid carrier. In general, we use from about 5 weight percent to about 35 weight percent sulfur based on the weight of the liquid ammonia. As has been indicated, it is preferable to continuously add $NH_3$ and sulfur as it is used. However, intermittent addition can be used as can batch operation be utilized. However, as the product is produced, the rate of reaction decreases, therefore, the continuous or intermittent method is preferred. Since both ammonium sulfate and ammonium thiosulfate are insoluble in liquid ammonia, the product precipitates as it is formed and can be continuously or intermittently withdrawn from the bottom of the reactor, the ammonia flashed off, liquefied and recycled along with make up ammonia and sulfur.

The solubility of ammonium sulfate and ammonium thiosulfate increases with the percent of water present as is shown in FIGURE 1.

FIGURE 1 is a plot of solubility of ammonium sulfate and ammonium thiosulfate against ammonium concentration in water.

From the figure, it can be seen that the water content should be kept low, with about a maximum of 20 weight percent water preferred and more preferably a maximum of about 5 weight percent.

A number of runs were made utilizing various temperatures and pressures, various ratios of sulfur to ammonia and utilization of $H_2S$ or $H_2O$. Since these were batch operations, the time is given in ½ time; however, this is indicative of rate of reaction. In all of these runs, the vessel was pressurized with $O_2$. Similar results have been obtained with air.

The conditions and results of these runs are shown in Table I.

sulfur based on the ammonia hereinafter defined into liquid ammonia containing not more than about 20 weight percent water, contacting the resulting solution with gaseous oxygen at a temperature from about $-33°$ C. to about 90° C. and recovering the resulting precipitate product.

TABLE I

| Run | Temp., °C. | Pressure, p.s.i.g., oxygen | S, g. | NH$_3$, g. | H$_2$S, g. | H$_2$O, g. | T.,½,[1] min. | Prod.,[2] g. | Percent ATS[3] | Percent AST[4] | Percent ASD[5] | NH$_3$Soly,[6] g. |
|---|---|---|---|---|---|---|---|---|---|---|---|---|
| 1 | −33 | 0 | 50 | 200 | 0 | 0 | [7] 1,440 | 42 | 83 | 17 | 0 | |
| 2 | 0 | 200 | 50 | 200 | 0 | 0 | 120 | 42 | 37 | 63 | 0 | |
| 3 | 75–90 | 2,800 | 50 | 200 | 0 | 0 | 4 | 80 | 40 | 60 | 0 | |
| 4 | 18 | 800 | 20 | 200 | 0 | 0 | 3 | 28 | 40 | 60 | 0 | 20 |
| 5 | 25 | 1,000 | 40 | 200 | 0 | 0 | 2 | 35 | 45 | 55 | 0 | 33 |
| 6 | 60–80 | 1,000 | 40 | 200 | 0 | 0 | 9 | 53 | 42 | 58 | 0 | |
| 7 | 45–60 | 600 | 27 | 200 | 0 | 0 | 2 | 37 | 66 | 34 | 0 | 23 |
| 8 | 40–50 | 425 | 32 | 200 | 0 | 0 | 12 | 31 | 65 | 35 | 0 | 37 |
| 9 | 45–50 | 875 | 32 | 200 | 0 | 0 | 3 | 30 | 88 | 12 | 0 | 29 |
| 10 | 35–50 | 425 | 27 | 200 | 6 | 0 | 5 | 31 | 74 | 26 | 0 | 14 |
| 11 | 60–70 | 880 | 27 | 200 | 6 | 0 | 4 | 29 | 66 | 34 | 0 | 23 |
| 12 | 30–45 | 1,000 | 27 | 200 | 6 | 0 | 6 | 46 | 60 | 40 | 0 | 22 |
| 13 | 20 | 425 | 27 | 200 | 6 | 0 | 125 | 51 | 59 | 41 | 0 | 35 |
| 14 | 25 | 400 | 27 | 200 | 6 | 0 | 4 | 42 | 74 | 26 | 0 | |
| 15 | 75–90 | 870 | 21 | 200 | 11 | 0 | 3 | | 80 | 20 | 0 | 9 |
| 16 | 49–55 | 425 | 21 | 200 | 11 | 0 | 5 | 42 | 46 | 54 | 0 | 11 |
| 17 | 25–35 | 375 | 21 | 200 | 11 | 0 | 5 | 42 | 77 | 23 | 0 | 13 |
| 18 | 65–90 | 1,000 | 26 | 200 | 13 | 0 | 6 | 47 | 75 | 25 | 0 | 10 |
| 19 | 20–35 | 600 | 16 | 200 | 17 | 0 | 4 | 32 | 90 | 10 | 0 | 7 |
| 20 | 18–22 | 425 | 0 | 200 | 34 | 0 | 12 | 77 | 45 | 32 | 23 | 2 |
| 21 | 10 | 300–400 | 25 | 500 | 0 | 0 | 17 | 51 | 57 | 39 | 4 | 30 |
| 22 | 10 | 300–400 | 25 | 500 | 0 | 7 | 35 | 50 | 74 | 14 | 12 | 13 |
| 23 | 10 | 300–400 | 25 | 500 | 0 | 14 | 35 | 56 | 87 | 8 | 5 | 8 |
| 24 | 20 | 300–400 | 25 | 500 | 0 | 21 | 15 | 71 | 67 | 23 | 10 | 8 |
| 25 | 38 | 300–400 | 25 | 500 | 0 | 0 | 95 | 38 | 55 | 44 | 1 | 29 |
| 26 | 38 | 300–400 | 25 | 500 | 0 | 7 | 240 | 52 | 70 | 27 | 3 | 13 |
| 27 | 38 | 300–400 | 25 | 500 | 0 | 14 | 240 | 65 | 70 | 28 | 2 | 6 |
| 28 | 38 | 300–400 | 25 | 500 | 0 | 21 | 180 | 69 | 52 | 46 | 2 | 10 |

[1] Reaction time to obtain ½ of the product.
[2] Experimental difficulties force these numbers to have relative value only.
[3] Ammonium thiosulfate titrated with iodate solution.
[4] Ammonium sulfate obtained by difference.
[5] Ammonium sulfite obtained by difference in ATS titration after addition of formaldehyde. (Runs 1–19 sulfite content not calculated and would show up as thiosulfate.)
[6] Solids obtained after evaporation of ammonia solution and usually contained about 40% sulfur.
[7] No stirring on sample 1; all other samples were either stirred in a rocker bomb or were stirred magnetically with a Teflon bar.

From the table, it can be seen that the ammonium thiosulfate-ammonium sulfate ratio can be varied over a wide range by varying the conditions.

To show the effectiveness of the product as a fixing solution, a standard fixing solution and a fixing solution using the product of this invention were prepared. The standard fixing solution was prepared by adding to 600 cc. of water, 240 grams $Na_2S_2O_3$; 30 grams $Na_2SO_4 \cdot 7H_2O$; 48 cc. of 28% acetic acid; 7.5 grams boric acid crystals; 15 grams potassium aluminum and additional cold water to make 1000 cc.

A second solution was prepared by using 265 grams of the product of run 23 in place of the $Na_2S_2O_3$ and $NaSO_3 \cdot 7H_2O$. Otherwise, the solutions were identical and prepared in the same manner. Exposed negatives were then placed in the two solutions. After leaving in the solutions for the same length of time, the negatives were washed free of fixing solution with cold water. The fixing solution prepared from the product of the invention gave a clearer film than did the standard solution.

It will be obvious to those skilled in the art that many modifications can be made in the process and conditions varied over a wide range without departing from the spirit and scope of this invention.

Having thus described our invention, we claim:

1. A process for producing a mixture of ammonium sulfate and ammonium thiosulfate, said process comprising introducing from about 5 to about 35 weight percent sulfur based on the ammonia hereinafter defined into liquid ammonia containing not more than about 20 weight percent water, contacting the resulting solution with gaseous oxygen at a temperature from about $-33°$ C. to about 90° C. and recovering the resulting precipitate product.

2. A process for producing a mixture of ammonium sulfate and ammonium thiosulfate, said process comprising continuously introducing liquid ammonia and from about 5 to about 35 weight percent sulfur based on the ammonia into a reaction zone containing not more than about 20 weight percent water at a temperature from about $-33°$ C. to about 90° C., continuously introducing oxygen into said zone so as to bubble through the liquid ammonia-sulfur solution and removing precipitate product from the bottom of said zone.

3. The process of claim 2 wherein said oxygen is introduced as atmospheric air.

4. The process of claim 3 wherein 0 to 20 weight percent hydrogen sulfide is maintained in the reaction zone.

References Cited

UNITED STATES PATENTS 2,898,190   8/1959   Grosskinsky et al.   23—115
3,360,355   12/1967   Horsley et al.   23—224 X OSCAR R. VERTIZ, Primary Examiner E. C. THOMAS, Assistant Examiner U.S. Cl. X.R.

23—119, 138; 71—61